3,083,142
IMPROVED SWINE ERYSIPELAS VACCINE
Dennis George Howell, Rickmansworth, Robert Parr, South Ealing, London, and Kathleen Rosemary Heath, Greenford, England, assignors to Glaxo Group Limited, a British company
No Drawing. Filed Feb. 25, 1959, Ser. No. 795,322
Claims priority, application Great Britain Feb. 27, 1958
7 Claims. (Cl. 167—78)

This invention is concerned with improvements in or relating to vaccines.

In the administration of vaccines it is often the case that sufficient vaccine to produce satisfactory immunity against a particular disease cannot be administered in a single injection. Many vaccines are therefore administered in two or even three injections at intervals of a few weeks or more.

Particularly in veterinary medicine, and where it is required to vaccinate large numbers of animals, the labour and hence expense involved in giving injections is considerable and to have to administer second or even third injections of vaccine may represent a substantial increase in the cost of rearing the animals. This problem is particularly acute where range animals are concerned since the labour of rounding up the herds two or three times in the course of a few weeks is often prohibitive.

It has been suggested that adjuvants could be added to vaccine preparations for the purpose of delaying the release of antigen into the system and so thereby reducing the number of doses necessary to set up a satisfactory antibody response. In particular, it has been proposed to present the antigenic material in a water-in-oil emulsion, the antigen being contained in the disperse aqueous phase and its absorption into the system so being delayed by the surrounding continuous oil phase. Such preparations have in many instances proved unsatisfactory in use as they frequently give rise to considerable undesired local reactions at the site of injection which may impede the desired release of antigen.

We have now found that a vaccine dispersed in certain types of oil-in-water emulsion hereinafter referred to possess marked advantages over the hitherto proposed water-in-oil emulsion-based vaccines. The oil-in-water emulsions thus used for the purpose of the present invention are those which can be described as being stabilised and remaining substantially stable even following injection into muscle tissue. In experiments, we have carried out, we find that many emulsions, when injected into living muscular tissue, rapidly break down into separate oil and water phases with the result that the oil phase tends to cause necrosis or other tissue damage, whilst the separated aqueous phase no longer has the protecting action of the oil intended to delay release of antigen; this phenomenon is noted even with emulsions which in vitro would normally be considered as quite stable. For the purpose of the present invention, therefore, we use emulsions which are stabilised, i.e. so formulated that they remain substantially stable for some time following injection into animal muscle tissue.

The vaccines prepared according to the invention cause substantially less tissue damage than vaccines hitherto prepared with oily adjuvants and give rise to a more reliable and usually better delayed release of antigen.

It has also been observed that vaccine preparations according to the invention are in general easier to inject than many hitherto proposed vaccines based on water-in-oil emulsions, being capable of production in a more readily flowing form.

According to the present invention we provide an injectable vaccine preparation comprising antigenic material dispersed in a parenterally acceptable stable emulsion of an oil dispersed in a continuous aqueous phase.

The term "antigenic material" is used in this specification to mean material derived from the culture of a pathogenic organism, which material on introduction into animal blood gives rise to antibodies serving to protect against or combat infection.

The oil-in-water emulsions according to the invention will generally be prepared with the aid of parenterally acceptable wetting agents which serve to form and stabilise the desired emulsion.

As is well known, the formation of an oil-in-water emulsion as distinct from a water-in-oil emulsion involves suitable choice of wetting agent or agents, having regard to the relative proportions of the oil and water phases and their exact nature. The consistency of an emulsion and hence its suitability for injection is also dependent on its constituents. Thus for the purpose of the present invention it is necessary so to choose the constituents of the emulsion that an oil-in-water emulsion (as distinct from a water-in-oil emulsion) is formed and that its consistency is such that it can be injected. It is further necessary that the emulsion be stable and remain as an emulsion after injection into muscle tissue.

The wetting agents used in the preparation of the stabilised emulsion forming the base of the vaccines according to the invention are preferably of the non-ionic type. With such wetting agents more reliable stability of the emulsion on injection is secured and there is less tendency for the wetting agent to be precipitated from the aqueous phase by components of the antigen preparation than when a cationic or anionic wetting agent is used.

We have found it preferable to employ a two-component wetting agent system, one of the wetting agents serving primarily to form the emulsion and the second primarily to stabilise the emulsion once formed. As is known, for example, the water-soluble or preferentially water soluble wetting agents generally act as emulsifying agents whilst wetting or surface active agents which are oil-soluble (or preferentially oil soluble) are known generally to exert a stabilising effect on emulsions and many different wetting agents are now offered on the market both for emulsifying and stabilising purposes.

The following types of wetting agents have been found to be particularly useful for the purpose of the present invention.

Type (a).—Polyhydric alcohols, or their anhydrides, esterified with fatty acids, for example, sorbitan monostearate, propylene glycol monostearate, diglycol monostearate, mannitan mono-oleate, sorbitan sesquioleate, glyceryl monostearate, propylene glycol mono-oleate, propylene glycol monolaurate, diglycol monolaurate, diglycol mono-oleate, diglycol monopalmitate, diglycol monoricinoleate, pentaerythritol monostearate, pentaerythritol distearate, pentaerythritol dioleate, pentaerythritol glycerol oleate, pentaerythritol dioleostearate, low-molecular polyoxyethylene oleate, glyceryl mono-groundnut acid ester, polyglyceryl monostearate, polyglyceryloleate, glycol monostearate, glyceryl mono-oleate, glyceryl monopalmitate and low-molecular polyoxyethylene monostearate.

The wetting agents of the above type (a) are, in general, oil-soluble and hence suitable as stabilising agents. The following type, type (b), however, are generally water-soluble and so suitable as emulsifying agents.

Type (b).—Polyoxyalkylene derivatives of esters of polyhydric alcohols, for example polyoxyethylene sorbitan monostearate, polyoxyethylene propylene glycol monostearate, polyoxyethylene glycol monolaurate, polyoxyethylene glycol mono-oleate, polyoxyethylene glycol monostearate, polyoxyethylene glyceryl stearate, polyoxyethylene sorbitan monopalmitate, polyoxyethylene sorbitan monolaurate, polyoxyethylene sorbitan trioleate, and polyoxyethylene sorbitan mono-oleate.

Further types of wetting agents which may be of use include the following:

*Type (c).*—Water soluble fatty acid esters of polyethylene glycol, for example polyethylene glycol 300 dilaurate, polyethylene glycol 300 monostearate, polyethylene glycol distearate and nonaethylene glycol mono-oleate, lower molecular polyglycol ricinoleate, lower molecular polyglycol monocaprate-caprylate, lower molecular polyglycol monolaurate.

*Type (d).*—Fatty alcohols condensed with ethylene oxide e.g. the material sold as Collone A.C. or Abracol S.W. These wetting agents are water-soluble and hence suitable as stabilising agents.

The stabilising agents of type (*a*) are preferably used in conjunction with the emulsifying agents of type (*b*). Thus, one especially suitable combination is sorbitan monostearate with polyoxyethylene sorbitan monostearate while another is propylene glycol monostearate with polyoxyethylene monostearate, advantageously combined with diglycol monostearate. The material Collone A.C. is preferably used in conjunction with sorbitan monostearate and/or low-molecular polyoxyethylene monostearate.

The exact proportion of wetting agents to be used will depend on their nature. However, using a combination of non-ionic emulsifying and stabilising agents, we find in general that from 0.5 to 1.5% of emulsifying agent in combination with from 0.5 to 1.5% of stabilising agent gives satisfactory results. The ratio of emulsifying agent to stabilising agent can thus vary between 1:3 and 3:1. It should be noted that too great a proportion of wetting agent—either of the emulsifying or the stabilising type—is undesirable and may cause instability or even breaking of the emulsion or phase reversal.

The proportion of oil to water is important and preferably the proportion of oil to water in the emulsion should not be more than 65% but preferably not less than 30%. Desirably the proportion of oil to water should be within the range of from 40–60%. The composition of the emulsion base should, however, be correlated with the quantity of water (if any) added with the antigen and the final product, in order to be reliably stabilised, preferably contains more than 10% of oil.

In order to determine the suitability of a given set of emulsion components for preparing a stable oil-in-water emulsion of suitable "thinness" for injection one merely blends the components in a homogeniser and leaves the emulsion so formed to stand for a prolonged period. Any tendency to separation or complete "cracking" can then be simply observed. Where there is doubt as to whether an oil-in-water or a water-in-oil emulsion has been formed, one can add a dye which is soluble in only one phase and examine to see whether the disperse or the continuous phase is coloured. Alternatively one can determine the conductivity of the emulsion which would be far lower for a water-in-oil emulsion than for an oil-in-water emulsion. The emulsion should be tested in vivo; for example, it may be injected into the muscle tissue of an experimental animal e.g. a mouse, and, after some days, the animal sacrificed and the tissue surrounding the site of injection examined. If the emulsion is sufficiently stabilised there should be no substantial necrosis and usually there will be some of the emulsion still present.

The oils which may be employed to prepare the oil-in-water emulsions may comprise vegetable oils, for example arachis, olive, sesame, soya bean, castor and cottonseed oils as well as oily esters e.g. ethyl oleate, dibutyl sebacate and isoamyl salicylate. However, we find that mineral oils of a pharmaceutical grade e.g. light liquid paraffin, are to be preferred as they in general, and surprisingly, cause even less tissue irritation than the vegetable oils. This we believe to be due to possible greater stability of mineral oil emulsions and hence less tendency for them to break after injection, the fine oil droplets being eventually dispersed by phagocytosis.

In the preparation of the vaccines according to the invention it is convenient to prepare the oil-in-water emulsion by, for example, blending the oil, water and wetting agents in a homogeniser often at elevated temperature, for example at about 60° C., and to mix this emulsion with the antigenic material in the desired proportions.

The final vaccine must not contain unwanted organisms and it is thus necessary to sterilise the various components of the vaccine. Where heat is used for sterilisation, the emulsion or other components must be sterilised in the absence of the antigenic material, which would be destroyed by the high temperature. If the emulsion does not withstand heat sterilisation it is possible to sterilise the oily and aqueous components before emulsification. In general, the oil may be sterilised by heating to about 160° C. for one hour while the aqueous medium may be sterilised in the autoclave at 15 lbs. pressure for 30 minutes. The emulsion should be cooled before mixing with the antigenic material since few antigens can withstand temperatures in excess of 40° C. and are best kept at room temperature or below. However, it is often preferable to emulsify the oil with an aqueous suspension of the antigenic material, particularly where a high concentration of antigenic material in the final vaccine is required. Thus if the antigen is obtainable only in the form of an aqueous suspension and the emulsion is prepared separately, it is necessary to add a substantial quantity of aqueous suspension to the emulsion to obtain the required high antigen concentration which may seriously affect the stability of the emulsion. In such cases it is often possible to avoid the elevated temperatures generally used in preparing the emulsions since, when a water soluble wetting agent, such as polyoxyethylene monostearate, is added to the antigen suspension and a more oil soluble wetting agent, such as propylene glycol monostearate, to the oil, it is generally possible to prepare the emulsion by blending at room temperature.

It is also possible to prepare the oil-in-water emulsions from a gel of the oil. The gelling agent is usually a metal soap of a long chain fatty acid e.g. aluminium stearate, aluminium oleate, aluminium palmitate, lithium stearate, calcium oleate etc. In general it is possible to use a somewhat lower proporation of oil in the emulsion when a gel is used. One suitable gel comprises arachis oil containing between 1.5 and 2.5% aluminium stearate.

While the antigenic material incorporated in the preparations according to the invention may be of substantially any kind or in any form, the following have been found particularly suitable for presentation with oil-in-water emulsions.

(1) Bacterial toxoids from which dead bacteria have been removed, for example, toxoids, from *Staphylococcus aureus*. Clostridial toxoids, in particular toxoids from *Cl. welchii*, types B, C and D, which give protection in various combinations against lamb dysentry and pulpy kidney disease and enterotoxaemia in sheep and toxoids from *Cl. tetani* which give protection against tetanus.

(2) Bacterial vaccines containing dead bacteria, for example preparations from *Erysipelothrix rhusiopathiae* which give protection against erysipelas in pigs and turkeys, also Brucella, Salmonella and Leptospiral vaccines.

(3) Viral vaccines, for example, Swine fever virus, Foot and Mouth virus, Loupin ill virus, Enzootic abortion virus, Infectious Larynys tracheitis virus, Newcastle disease virus, and Infectious Bronchitis virus.

It will be appreciated that it is often advantageous to administer to an animal two vaccines giving protection against different diseases and that it is convenient to combine these into a single vaccine for simultaneous administration. Thus the toxoid from *Cl. welchii* type D toxin, which protects against pulpy kidney disease in lambs, can be combined with toxoid from *Cl. tetani*, which protects against tetanus, so as to protect young lambs against both these diseases.

The antigenic material may be incorporated into the oil-in-water emulsion in substantially any convenient form. It may thus be a dried solid, if desired purified, an adsorbate on a parenterally acceptable adsorbant, for example aluminium phosphate, or aluminium hydroxide, pumice or kieselguhr or a suspension in a parenterally acceptable liquid. The final vaccine should, however, be pyrogen free and should contain as little material as possible which gives rise to unwanted reaction in the body. The aqueous phase of the final vaccine is also preferably substantially isotonic, that is the sodium chloride concentration in the aqueous phase is preferably about 0.85%, and it may contain preservatives such as phenol or thiomersalate.

The invention will now be described with reference to two particular embodiments thereof. It will be understood that these embodiments whilst representing vaccines which are of considerable use are only examples of many which can be prepared according to the invention.

VACCINE FOR THE CONTROL OF ERYSIPELAS IN SWINE

Erysipelas in swine is caused by the organism *Erysipelothrix rhusiopathae* and hitherto vaccines for the immunisation of swine against the disease have been prepared by culturing the organism on suitable nutrient media, killing the organism and adsorbing the immunising antigens so obtained on a suitable adsorbent, e.g. alumina, which is then suitably formulated for injection. The adsorbate of antigens has previously been proposed to be administered in various media, the principal use in Great Britain having been of simple aqueous suspensions; such preparations have usually been of unsatisfactory potency, and have given only relatively short immunity. To overcome these difficulties a vaccine has been proposed which is in the form of a water-in-oil emulsion but it was not acceptable due to the severe local reactions which occurred after injection and was, furthermore, difficult to inject.

We have found that a particularly effective vaccine preparation for the control of erysipelas in swine can be formulated comprising a stabilised emulsion of a parenterally acceptable oil in water, having dispersed therein an adsorbate of immunising antigenic material derived from the culture of *Erysipelothrix rhusiopathae* upon an injectable adsorbent. Such vaccines in accordance with the present invention can readily be prepared and have good antigenicity and are stable, readily injectable, do not, in general, give rise to marked reactions and give improved prolongation of action as compared with simple aqueous suspensions of an adsorbate of the antigens. In particular they are surprisingly better from various points of view, especially ease of injection, reduced tendency to cause reactions, etc., than erysipelas vaccines based on water-in-oil emulsions previously proposed.

In the preparation of the vaccines according to the invention, it is preferred to prepare separately an adsorbate of the antigenic material and blend this with an emulsion of the chosen oil in water; preferably the adsorbate of the antigens is first suspended in water containing a bactericidal agent, e.g. formalin or thiomersalate, and made isotonic with blood e.g. with the addition of sodium chloride. This suspension is then blended with the emulsion.

Preferably the proportion of oil to water in the emulsion before addition of the antigenic material is not more than 65% and is advantageously within the range of from 40–60%.

The proportion of adsorbate is also preferably within the range of from 5–25%, conveniently 10%.

The adsorbate of the antigens may be formed from any suitable adsorbent, examples of which are aluminum hydroxide, aluminum phosphate, pumice and kieselguhr. The adsorbate may be prepared in any desired way, for example by culturing the organism on a suitable nutrient medium, inactivating the culture containing antigens with for example formalin or thiomersalate, adding adsorbent to adsorb the antigens, the resultant adsorbate being separated, for example by centrifugation.

A virulent strain of organism should naturally be used for the production of this vaccine and, in general, organisms showing no substantial filamentous growth are suitable. We have found it preferable to culture the organism at or about 30° C., instead of the more usual 37° C., as in this way a more virulent culture is obtained. The medium used for the culture organism may be of standard type.

VACCINE FOR THE CONTROY OF LEPTOSPIROSIS IN CATTLE AND OTHER ANIMALS

Leptospirosis can be caused by the organism *Leptospira pomona*, the disease occurring in two phases. In the first phase, which is the acute phase, the infected animal shows clinical manifestations of the disease with accompanying fever, haemoglobinuria, and loss of condition which sometimes results in death. In the second phase the leptospira organisms colonize the kidney tubules and the animals, although apparently free from infection, become carriers, shedding viable leptospira organisms in the urine. They are thus a source of infection to any susceptible animal in the vicinity.

We have found it possible to formulate a particularly useful vaccine active against leptospirosis comprising a stabilised parenterally acceptable oil-in-water emulsion containing antigenic material derived from the culture of *Leptospira pomona*.

We find that by formulating the new vaccine in a stabilised oil-in-water emulsion a product is obtained which gives good protection against both phases of leptospirosis and has reasonably prolonged action. Thus our new vaccine is more reliable and effective than leptospirosis vaccines formulated in various other vehicles. In particular the new vaccine is more acceptable than a similar product in the form of a water-in-oil emulsion.

The vaccine according to the invention is prepared by culturing *Leptospira pomona*, preferably a virulent strain thereof, in a culture media therefor, killing the organism and incorporating the antigenic material thereby obtained into a stabilised oil-in-water emulsion according to this invention. Preferably the whole culture broth is used in the formulation of the vaccine.

We have found further that the choice of means used to kill the organism is of importance if best results are to be obtained. Thus, whilst for example thiomersalate, formalin or heat may be used for this purpose, much improved results are obtained by the use of a phenol. Such phenols include phenol itself, as well as the cresols resorcinol and the xylenols, of which phenol is preferred.

Various media may be used to support the growth of *Leptospira pomona* as will be well known to those skilled in the art. As with all microorganisms the cultural requirements of *Leptospira pomona* essentially comprise a source of nitrogen, a source of carbon and energy and nutrient salts. Very many materials are now known for this purpose, so that the choice of nutrients is very wide and it is a simple matter to choose nutrients suitable for the culture of *Leptospira pomona*. We prefer to use Korthofs medium ("Leptospirosis in Man and Animals" by Alston and Broom published by F. & S. Livingstone, London, 1958, page 303) containing sheep serum but other media which can be used include Vervoort's medium as modified by Schuffner (ibid., page 302) and Stuart's medium (ibid., page 304).

The culture is preferably carried out in at least two and preferably three stages. For example in the first or primary stage a culture is made from a suitable source of the organism e.g. an infected animal and grown up to form a suitable inoculum for a secondary or development stage. The culture from the secondary stage is then used as inoculum for a production stage. The media used are conveniently of the same constitution for each stage.

A suitable temperature for the culture is 27° C.

Following the culture the organims are killed and the broth is then suitable for formulation.

In the formation of the vaccine we prefer first to form an oil-in-water emulsion base and then incorporate the antigenic material therein care being taken to keep the emulsion as an oil-in-water emulsion.

Preferably the proportion of oil to water in the emulsion and before addition of the antigenic material is not more than 65% and is advantageously within the range of from 40–60%.

After formation of the emulsion base, the antigenic material preferably as the whole culture broth is incorporated therein by any convenient method, preferably by use of a high speed blender or homogeniser. The proportion of culture broth to be incorporated in the emulsion base is preferably from 40 to 60% of the base.

If desired instead of first forming an emulsion base and then incorporating the anhydrous material therein, the culture broth may for example be simply diluted as necessary and the oil emulsified therein. In this case it is preferable to add a water-soluble wetting agent to the aqueous suspension and an oil-soluble agent to the oil.

The use of vaccine adjuvants, such as aluminum hydroxide gel or aluminium phosphate is not necessary according to the invention, but such adjuvants may if desired be used. Thus for example the antigenic material may be adsorbed on to some suitable adsorbent and the adsorbates incorporated into the emulsion base. The direct incorporation of the whole culture broth into the base is however preferred.

For the better understanding of the invention we now give the following examples by way of illustration only.

*Example 1.—Preparation of Swine Erysipelas Vaccine*

(a) PREPARATION OF THE CULTURE BROTH

A liver extract is first prepared by infusing 9 lbs. of minced fat free, fresh ox liver with 9,200 mls. of distilled water, overnight in a refrigerator (+4° C.). This is then steamed for 2 hours (100° C.) and filtered through muslin and then Whatman's No. 54 filter paper. The filtrate is then sterilised in an autoclave at 10 lbs. pressure for 20 minutes for storage purposes.

The culture is then prepared from:

| | |
|---|---|
| Liver extract (as above) | 8%. |
| N.Z. amine (type E) | 4% in distilled water. |
| Sodium chloride | 0.5%. |
| Glucose | 0.05%. |

Heat to dissolve and adjust the pH to 7.5. Filter while still hot through Whatman's No. 54 filter paper. Sterilise by autoclaving at 10 lbs. pressure for 30 minutes. Add sterile inactivated horse serum, 50 mls. per litre. Incubate at 37° C. to test for sterility.

(b) THE PREPARATION OF ALUMINIUM HYDROXIDE

This is prepared by the method described in the World Health Organisation report No. 61. The gel is precipitated from aluminium sulphate by ammonia in the presence of ammonium sulphate, washed free from soluble salts and sterilised by autoclaving.

The aluminium hydroxide content is calculated to the weight in grams per ml. of gel.

(c) OIL-IN-WATER EMULSION

This is a sterile liquid paraffin emulsion syringeable through a No. 26 (British standard wire gauge) needle prepared from:

| | | |
|---|---|---|
| Light liquid paraffin (medicinal grade) | 44.5% w./v. | |
| Crill 8 (emulsifying agent) | 1.1% w./v. | |
| Crill 3 (stabilising agent) | 0.9% w./v. | |
| Sodium chloride | 0.85% | Vehicle to 100%. |
| Thiomersalate | 0.015% | |
| Distilled water to | 100% | |

Sterilise the paraffin by heating at 160° C. for one hour. Disperse the crills and dissolve the sodium chloride and thiomersalate in the water, then sterilise at 15 lbs. pressure for 30 minutes.

Add the water to the oil when both phases are at a temperature of 60° C. Homogenise. The final product contains 90% of this emulsion.

(d) VACCINE PREPARATION

*Culture and incubation.*—The strain employed for vaccine production is maintained in a freeze dried state (lyophilised) and when required is reconstituted in liver serum broth medium, incubated overnight at 30° C. and tested for purity. This culture is then used to inoculate the amount of broth required as an inoculum for the vaccine.

An 18 hour liver serium broth culture is used, adding 10 mls. of inoculum to 1 litre of medium. This is incubated at 30° C. for 48 hours.

*Killing of the bacteria.*—Add thiomersalate to the culture to give a final dilution of 0.02% or formalin 0.25%. Leave the culture in the incubator at 30° C. for 3 days and then test for any live bacteria by adding a quantity of the culture to a digest meat broth containing 0.1% cysteine hydrochloride to counteract the presence of any thiomersalate.

*Adsorption.*—When the culture is proved to be completely dead, enough aluminium hydroxide gel is added to give a final concentration of 1 mgm. per ml. The vaccine is shaken well and left overnight at +4° C. to adsorb.

*Concentration.*—The vaccine is now put through a centrifuge and the supernatant fluid removed. The deposit is scraped from the bowl of the centrifuge and thiomersalate saline is added. (The deposit from 100 litres of culture is made up to 2 litres with thiomersalate saline. This constituted 10% of the final vaccine.) A mechanical stirrer is used to break up the deposit, which is then added to the emulsion and homogenised. The deposit, from 100 litres of culture being made up to 20 litres with the emulsion so concentrating five times.

*Example 2.—Preparation of Leptospirosis Vaccine*

| Culture medium: | Grams |
|---|---|
| Bacto-peptone | 0.8 |
| Sodium chloride | 1.4 |
| Sodium bicarbonate | 0.02 |
| Potassium chloride | 0.04 |
| Calcium chloride | 0.04 |
| Potassium dihydrogen phosphate | 0.24 |
| Disodium hydrogen phosphate | 0.69 |
| Distilled water to 1 litre. | |

The medium is boiled to dissolve the constituents, autoclaved to allow any phosphate to precipitate and filtered. The pH is adjusted to 7.2 and the medium is bottled and autoclaved.

Before inoculation 10% sheep serum deactivated at 56° C. for two hours is added to the medium.

CULTIVATION OF VACCINE

*Primary cultures.*—To medium containing serum is added 0.5 ml. of blood from a heavily infected hamster. The primary culture is incubated for seven days. Checks are made on sterility and the leptospira is typed against standard immune sera.

*Secondary cultures.*—5.0 ml. of actively growing primary culture is added to 150 ml. conical flasks containing 50 ml. of the above medium and 5 ml. of serum. These flasks are incubated to maximum growth which is generally achieved in from seven to fourteen days.

*Final vaccine cultures.*—The leptospira are grown in 1 litre flasks containing 500 ml. of medium and 50 ml. of serum. One secondary culture is added to each vaccine flask and the whole incubated for seven days. Tests for sterility are carried out on the fifth day. The cultures in all the flasks are pooled after seven days growth. An aliquot is removed and counted. Phenol to 0.5% is then added to kill the leptospira and the pooled vaccine is refrigerated at 4° C.

After seven days the vaccine is then mixed in 50:50 proportions with an oil-in-water emulsion prepared as follows:

OIL AND WATER EMULSION

This a sterile liquid paraffin emulsion syringeable through a No. 26 (British standard wire gauge) needle prepared from:

| | |
|---|---|
| Light liquid paraffin (medicinal grade) | 44.5% w./v. |
| Crill 8 (emulsifying agent) | 1.1% w./v. |
| Crill 3 (stabilising agent) | 0.9% w./v. |
| Sodium chloride | 0.85 |
| Thiomersalate | 0.015% |
| Distilled water to | 100% |

Vehicle to 100%.

Sterilise the paraffin by heating at 160° C. for one hour. Disperse the crills and dissolve the sodium chloride and thiomersalate in the water, then sterilise at 15 lbs. pressure for 30 minutes.

Add the water to the oil when both phases are at a temperature of 60° C. Homogenise.

Further emulsion bases are illustrated in the following examples.

*Example 3*

| | Parts |
|---|---|
| Sorbitan monostearate (stabilising agent) | 1.5 |
| Polyoxyethylene sorbitan monostearate (emulsifying agent) | 0.5 |
| Light liquid paraffin | 45.0 |
| Saline | 53.0 |

*Example 4*

| | |
|---|---|
| Polyoxyethylene monostearate (emulsifying agent) | 0.5 |
| Propylene glycol monostearate (stabilising agent) | 2.0 |
| Diglycol monostearate | 0.75 |
| Light liquid paraffin | 43.75 |
| Saline | 53.0 |

In this example the light liquid paraffin may be replaced with an equal amount of arachis oil.

*Example 5*

| | Parts |
|---|---|
| Sorbitan monostearate (stabilising agent) | 2.0 |
| Polyoxyethylene sorbitan monostearate (emulsifying agent) | 1.0 |
| Aluminium stearate/arachis oil gel (2.4%) | 35.0 |
| Saline | 62.0 |

We claim:
1. An injectable vaccine preparation in the form of an oil-in-water emulsion comprising a preformed emulsion base which is stable in the presence of body fluids upon intramuscular injection and is an oil-in-water emulsion containing an aqueous phase substantially isotonic to the blood and an oil phase consisting essentially of from 30% to 65% of mineral oil, from 0.5% to 1.5% of a water-soluble nonionic emulsifying agent and from 0.5% to 1.5% of an oil-soluble nonionic stabilising agent; and an antigenic material consisting of dead *Erysipelothrix rhusiopathol*, the entire preparation containing more than 10% of mineral oil.

2. A preparation as claimed in claim 1 in which said antigenic material is an adsorbate on a parenterally acceptable adsorbent.

3. A preparation as claimed in claim 1 in which said emulsifying agent is a polyoxyalkylene derivative of a hexitan ester and said stabilising agent is a fatty acid ester of a polyhydric alcohol.

4. A preparation is claimed in claim 1 in which said emulsifying agent is polyoxyethylene sorbitan monostearate and said stabilising agent is sorbitan monostearate.

5. A preparation as claimed in claim 1 in which the proportion of oil to water in the emulsion base is between 40 to 60%.

6. A preparation as claimed in claim 1 in which said oil includes a gelling agent.

7. A preparation as claimed in claim 6 in which said gelling agent is a metal soap of a long chain fatty acid.

References Cited in the file of this patent

UNITED STATES PATENTS

| | | |
|---|---|---|
| 2,057,623 | Beard | Oct. 13, 1936 |
| 2,529,461 | Schneiderwirth | Nov. 7, 1950 |
| 2,675,343 | Clymer | Apr. 13, 1954 |
| 2,756,176 | Maurer et al. | July 24, 1956 |

FOREIGN PATENTS

| | | |
|---|---|---|
| 425,406 | Great Britain | Mar. 7, 1935 |

OTHER REFERENCES

Freund: "Annual Review of Microbiology," vol. 1, 1947 (pp. 291–308, page 304 is particularly pertinent), Annual Reviews, Inc., Stanford, Calif.

Hoag et al.: Am. Jour. Vet. Res., 16(60), pp. 381–385 (1955).

Trim et al.: Surface Activity and Permeability as Factors in Drug Action, pp. 111–142, in Symposia of the Society For Experimental Biology, No. III, Selective Toxicity and Antibiotics, 1949, Academic Press, Inc., New York, N.Y.

Woodhour et al.: "Development and Application of New Parenteral Adjuvants v. Comparative Potencies of Influenza Vaccines Emulsified in Various Oils," J. Immunology, vol. 86, No. 6, pp. 681–689 (1961).